United States Patent [19]
Ringö

[11] Patent Number: 5,744,220
[45] Date of Patent: Apr. 28, 1998

US005744220A

[54] THERMOSETTING LAMINATE

[75] Inventor: Peter Ringö, Hollviken, Sweden

[73] Assignee: Perstorp AB, Perstorp, Sweden

[21] Appl. No.: 696,571

[22] Filed: Aug. 16, 1996

Related U.S. Application Data

[63] Continuation-in-part of Ser. No. 167,964, filed as PCT/SE92/00475, Jun. 29, 1992, abandoned.

[30] Foreign Application Priority Data

Jul. 2, 1991 [SE] Sweden .................... 9102050

[51] Int. Cl.$^6$ .................................... B32B 9/00
[52] U.S. Cl. ............... 428/195; 428/172; 428/211; 428/327; 428/511; 428/533; 428/537.5; 428/904.4; 427/439; 427/411; 156/60; 156/79; 156/279
[58] Field of Search ..................... 428/535, 533, 428/534, 207, 327, 195, 204, 913.3, 530, 537.5, 904.4, 511, 172, 211, 478.8; 427/439, 411, 202; 156/79, 60, 307.4, 279, 324, 335, 219, 277, 222, 288

[56] References Cited

U.S. PATENT DOCUMENTS

| 145,221 | 12/1873 | Maitre . |
| D. 261,065 | 9/1981 | Ford et al. . |
| 2,205,798 | 6/1940 | Mattes . |
| 2,221,475 | 11/1940 | Goldschmidt . |
| 2,246,377 | 6/1941 | Mattes . |
| 3,810,774 | 5/1974 | Pittman . |
| 4,599,124 | 7/1986 | Kelly et al. . |
| 5,034,272 | 7/1991 | Lindgren et al. ............... 428/331 |

FOREIGN PATENT DOCUMENTS

| 0067147 | 12/1982 | European Pat. Off. . |
| 0355829 | 12/1990 | European Pat. Off. . |
| 463572 | 12/1990 | Sweden . |

*Primary Examiner*—Patrick Ryan
*Assistant Examiner*—Abraham Bahta
*Attorney, Agent, or Firm*—Watson Cole Stevens Davis, P.L.L.C.

[57] ABSTRACT

The present invention relates to a thermosetting decorative laminate (11), primarily intended as flooring laminate, comprising two or more layers (3, 4, 5), whereby at least one layer is a decorative layer (4) comprising a decor paper (9) provided with a bar pattern comprising a plurality of parallel rows of bars (14), whereby the bars (14) in adjoining rows preferably are mutually offset in the longitudinal direction. The bar pattern allows said laminate (11) to be divided into m longitudinal units or panels each consisting of p rows of bars (14), whereby said unit or panel comprises m×p rows of bars (14). The pattern of each left end bar (A1–A9) matches the pattern of corresponding right end bars (B1–B9) of each unit or panel and the pattern of these bars matches the pattern of corresponding end bars (A, B) in corresponding rows of all m units or panels. In a further aspect the present invention refers to a floor board (12) made from a panel of said laminate and in yet a further aspect to said decor paper (9).

14 Claims, 3 Drawing Sheets

THERMOSETTING LAMINATE

CROSS REFERENCE TO RELATED APPLICATION

Continuation-in-Part of Ser. No. 08/167,964, filed as PCT/SE92/00475, Jun. 29, 1992, now abandoned.

BACKGROUND OF THE INVENTION

1. Field of the Invention

The present invention relates to a thermosetting decorative laminate, primarily intended as flooring laminate, comprising two or more layers, whereby at least one layer is a decorative layer comprising a decor paper provided with a bar pattern comprising a plurality of parallel rows of bars, whereby the bars in adjoining rows preferably are mutually offset in a longitudinal direction. In a further aspect the present invention refers to a floor board made from said laminate and a carrier and in yet a further aspect to said decor paper.

2. Description of the Related Art

Laminate floors are well known in the art and recognized as excellent replacements for parquet floors, wall-to-wall carpets and the like. Laminate floors are normally produced from so called decorative thermosetting laminates, usually consisting of two or more layers including a base layer of for instance kraft paper, textile or glass fiber impregnated with a thermosetting phenolic or epoxide resin, such as phenol-formaldehyde resins, and a decorative layer consisting of a decor paper impregnated with a thermosetting resin such as a melamine-formaldehyde or a urea-formaldehyde resin. Decorative laminates often comprises one or more transparent overlays, improving for instance the resistance, and/or underlays. A decorative laminate is produced by laminating the various layers at a high pressure and an elevated temperature.

The laminate obtained is then glued or laminated onto a carrier of for instance particle or fiber board. The thus produced laminated panel is then normally pre-fabricated by being sawed up into a number of floor boards, which boards normally are provided with a groove and tenon arrangement on the long and short sides. Produced floor boards have normally a thickness of about 7 mm. They can thus be put on top of an existing flooring material.

Alternatively, one or more sheets or the like of the above decor paper instead of said laminate can be laminated directly to a carrier made of for instance particle or fiber board.

Bar patterns are very common ornamental design in laminated floors, wall coverings and the like. Such patterns usually consist of several parallel rows of the same width, wherein bars in adjoining rows are mutually offset in a longitudinal direction. An increasingly popular type is floor boards having three bars, that is floor boards with three rows of bars from a laminate having such a bar pattern.

In the International Patent Application WO 91/06728, the production of a pattern sheet for the manufacture of laminated floors with a bar pattern is disclosed. It is stated that a laminate can not be sawed with a precision sufficient enough to get the desired number of rows of bars holding the same width. Therefore, in order to overcome the alleged problem the bar pattern has been designed so that certain bars have about twice the height of the other bars. The panel is sawed up to floor boards in the larger bars. Any saw setting error can thereby be adjusted easier. It is with modern and adequate equipment possible to saw with such a precision that the saw cut will land in the desired place at the border between two rows of bars and there is thus no need to design a pattern having different height of the rows of bars wherein the saw cut is to be made.

U.S. Pat. No. 2,246,377 discloses a siding material of type rigid base panel having one face covered with a water proofing material and surfaced with granular material. The panel has designs impressed or otherwise applied to the coated face to simulate the appearance of masonry elements. The panel is thus provided with surface elevations and surface impressions to simulate for instances bricks and mortar joints. It is easy land a saw cut in and follow such impressions in the surface. Thermosetting laminates normally lack said impressions facilitating a high quality performed sawing or other cutting.

There is a problem with pattern sheets provided with bar pattern which is neither disclosed nor solved in above documents. The pattern is in the production of decorative laminates normally provided by means of a decor paper used in the form of rolls. The roll is thereby cut into sheets all of the same length. No consideration is then taken to how the pattern come out on the various sheets. Therefore, problems with the pattern arise repeatedly at the short ends of for instance floor boards. The length of the bars will accordingly vary. Sometimes they are undesirably long and sometimes they are far too short. Especially blocks being too short at the short ends of the boards give an unpleasant and disturbing effect to the finished floor. It even happens that entire floor boards having bars being too short must be rejected. Furthermore, the negative effect is strengthened even more if the decor or the color of the end bars of one board is very different from the end bars of next board.

SUMMARY OF THE INVENTION

The present invention provides a decorative laminate suitable as flooring laminate, wherein above problems and drawbacks are entirely eliminated. The decorative thermosetting laminate comprises two or more layers and is produced by laminating the different layers at a high pressure and at an increased temperature. At least one layer is a decorative layer consisting of at least one decor paper impregnated with at least one thermosetting resin. The decor paper consists of a patterned sheet having a bar design composed of a plurality of parallel rows of bars, each bar having a defined pattern, whereby the bars in adjoining rows are mutually offset in a longitudinal direction. The bar pattern, furthermore, allows said laminate to be divided into m longitudinal units or panels each consisting of p rows of bars, whereby said unit or panel comprises m×p rows of bars. The pattern of each left end bar matches the pattern of corresponding right end bar of each unit or panel and the pattern of these bars matches the pattern of corresponding end bars in corresponding rows of all m units or panels.

The thermosetting resin is in preferred embodiments a melamine-formaldehyde or urea-formaldehyde resin. In likewise preferred embodiments are m and p equal to 3, whereby the pattern of the left and right end bars are repeated in every fourth row of bars. All bars are most suitably of equal height and, with an optional exception for left end and right end bars, of equal length.

The invention refers in a further aspect to a floor board comprising being produced from said decorative thermosetting laminate and a carrier to which said laminate is bonded. The carrier preferably consists of wood or particle or fiber board and the laminate is suitably bonded to the carrier by means of gluing or lamination.

In yet a further aspect the present invention refers to a decor paper for use in at least one decorative layer of said thermosetting laminate. The decor paper has a bar design composed of a plurality of parallel rows of bars, each bar having a defined pattern, and the bars in adjoining rows are mutually offset in a longitudinal direction. The bar pattern allows the decor paper to be divided into m longitudinal units or sheets each consisting of p rows of bars, whereby said unit or sheet comprises m×p rows of bars. The pattern of each left end bar matches the pattern of corresponding right end bar of each unit or sheet and the pattern of these bars matches the pattern of corresponding end bars in corresponding rows of all m units or sheets. Said sheet is in preferred embodiments produced from a roll having a repeated bar pattern, which the roll is cut into sheets all having a similar positioning of the pattern. m and p are both preferably 3, whereby the pattern of the left and right end bars are repeated in every fourth row of bars and all bars are preferably of equal height and, with an optional exception for left end and right end bars, of equal width.

Alternative embodiments of the present invention include said decor paper being impregnated with a thermosetting resin, such as a melamine-formaldehyde or urea-formaldehyde resin, and laminated to a carrier, such as wood or particle or fiber board.

Through above disclosed positioning of the bar pattern on the decor paper will this lengthwise preferably correspond fully in the different sheets. In order to facilitate such an exact cutting of a roll shaped decor paper, it is suitable to print special cutting marks at the edge of a paper web beside the true decor at the same time as the decor printing. These cutting marks are then used when the paper is cut.

A simple correlation can be made of the matching of left end bars and the matching of right end bars. The matching end bars can then be designated A for the left end bars and B for the right end bars. The left end bars $A_n$, $A_{n+m}$, $A_{n+2m}$, ... $A_{n+(p-1)m}$ then match the corresponding right end bars $B_n$, $B_{n+m}$, $B_{n+2m}$ ... $B_{n+(p-1)m}$. In addition $A_n$ matches all left end bars $A_{n+m}$, $A_{n+2m}$ ... $A_{n+(p-1)m}$ and $B_n$ matches all right end bars $B_{n+m}$, $B_{n+2m}$ ... $B_{n+(p-1)m}$. p is the number of floor boards in breadth on the decor paper, m is the number of rows of bars per board and n is an arbitrary ordinal number between 1 and m. If p is 3 and m is 3 all right and left end bars having the ordinal numbers 1, 4 and 7; 2, 5 and 8; and 3, 6 and 9; respectively, will thus have matching patterns.

The expression matching patterns does not mean that the patterns must have exactly the same color and/or appearance. Wooden patterns suitably have matching patterns of a similar color. The graining can, however, differ somewhat. In a general sense the expression matching patterns means that the color and the pattern of the individual short end bars are decided in advance, so that a floor with an optimal pre-determined appearance can be brought about by means of the floor boards produced. The color and pattern of the short end bars will thus not be decided by chance.

The decor paper according to the invention are preferably produced in rolls with a repeated bar pattern, whereby the roll is cut into sheets preferably having exactly the same positioning of the pattern on all sheets. It is of course no hindrance to print the pattern on separate sheets instead. This is, however, because of the expense usually a disadvantage.

Normally the bars in all rows have substantially the same height and length. It is however possible to vary the height and/or length of the rows. For example you can have one narrow row, one row being twice as wide and a narrow row again on each board. The number of rows of bars on each board is according to above usually three, but the number can for example be two, four or more.

These and other objects and the attendant advantages will be more fully understood from the following detailed description, taken in conjunction with appended drawings, wherein like reference numerals have been applied to like parts throughout the various figures, the various parts are, however, for reason of easier reading and simplicity not according to scale.

A1 matches B1
A2 matches B2
A3 matches B3
A4 matches B4
A5 matches B5
A6 matches B6
A7 matches B7
A8 matches B8
A9 matches B9

Figure 1:
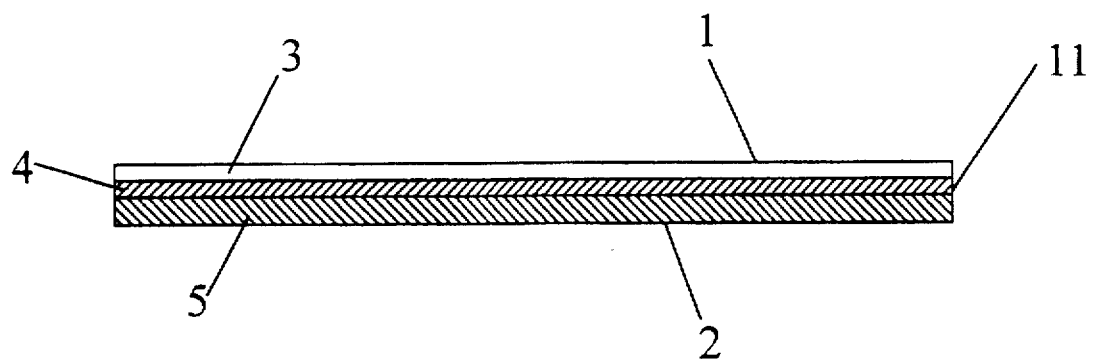
FIG. 1 is a schematic illustration of a crosscut of an embodiment of a thermosetting decorative laminate 11 comprising three layers 3, 4 and 5. Layer 3 constitutes an upper 1 and layer 5 a lower 2 surface of said laminate 11. Layer 3 is a sheet of α-cellulose impregnated with a melamine-formaldehyde resin and layer 4 is a decor paper, according to the invention, also impregnated with a melamine-formaldehyde resin. Layer 5 is a kraft paper impregnated with a phenol-formaldehyde resin. The different layers 3, 4 and 5 are laminated under pressure and heat to form said thermosetting laminate 11.
Figure 2:
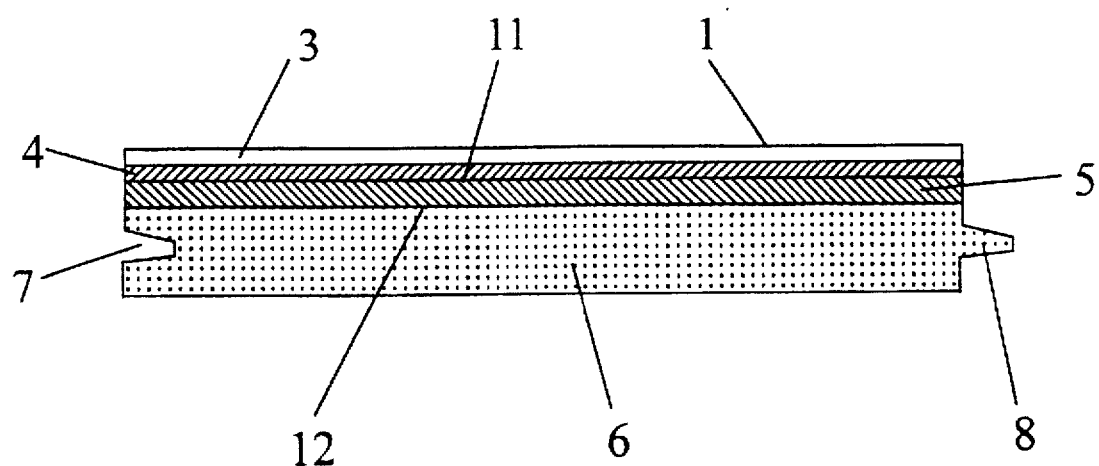
FIG. 2 is a schematic illustration of a crosscut of a floor board 12 comprising the same embodiment of a thermosetting decorative laminate 11 as shown in FIG. 1 comprising the same layers 3, 4 and 5. The laminate 11 is glued onto a carrier 6 made of fiber board. The carrier is provided with a groove and tenon 7 and 8 arrangement.
Figure 3:
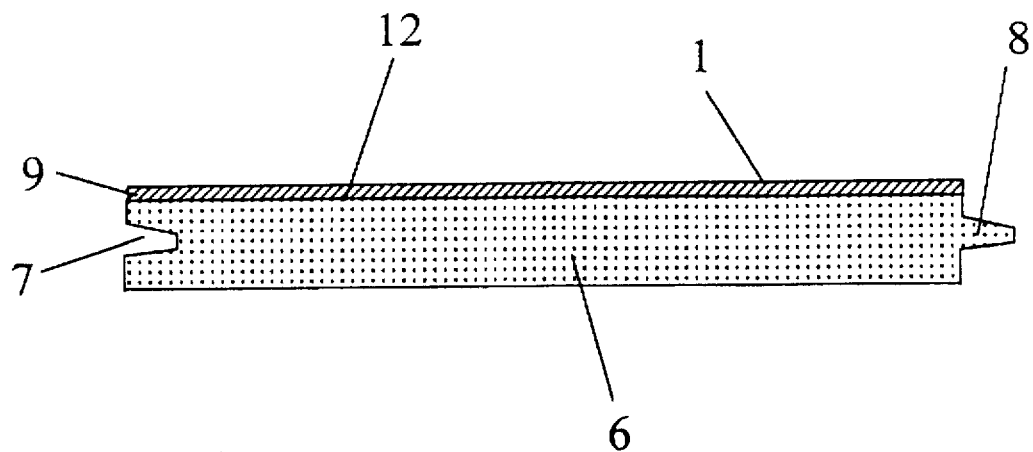
FIG. 3 is a schematic illustration of a crosscut of a decorative paper 9, according to the invention, being impregnated with a melamine-formaldehyde resin and laminated direct to a carrier 6. The carrier 6 is of the same embodiment as the carrier 6 shown in FIG. 2.

Moreover the patterns of the different left end bars A match each other as follows: A1 matches A4 and A7, A2 matches A5 and A8, A3 matches A6 and A9. Finally the patterns of the different right end bars match each other as follows: B1 matches B4 and B7, B2 matches B5 and B8, B3 matches B6 and B9. The sheet 13 was impregnated with a melamine-formaldehyde resin and used as a decorative layer 4 in production of a decorative thermosetting laminate 11 and a floorboard 12 (see FIGS. 1–3). A floorboard 12 (se FIGS. 2, 3 and 5) was obtained when a laminate 11 (see FIGS. 1 and 2) comprising illustrated sheet 13, possible to divide into a number of panels, was glued or laminated onto a carrier 6 (see FIGS. 2 and 3) and sawed up into three floor boards 12 (se FIG. 5). Longitudinal saw cuts were made exactly between rows A3/B3 and A4/B4 and between rows A6/B6 and A7/B7. The floor board 12 (see FIG. 5) was then provided with a groove and tenon arrangement 7 and 8 (see FIGS. 2 and 3) on its long and short sides.

Figure 4:
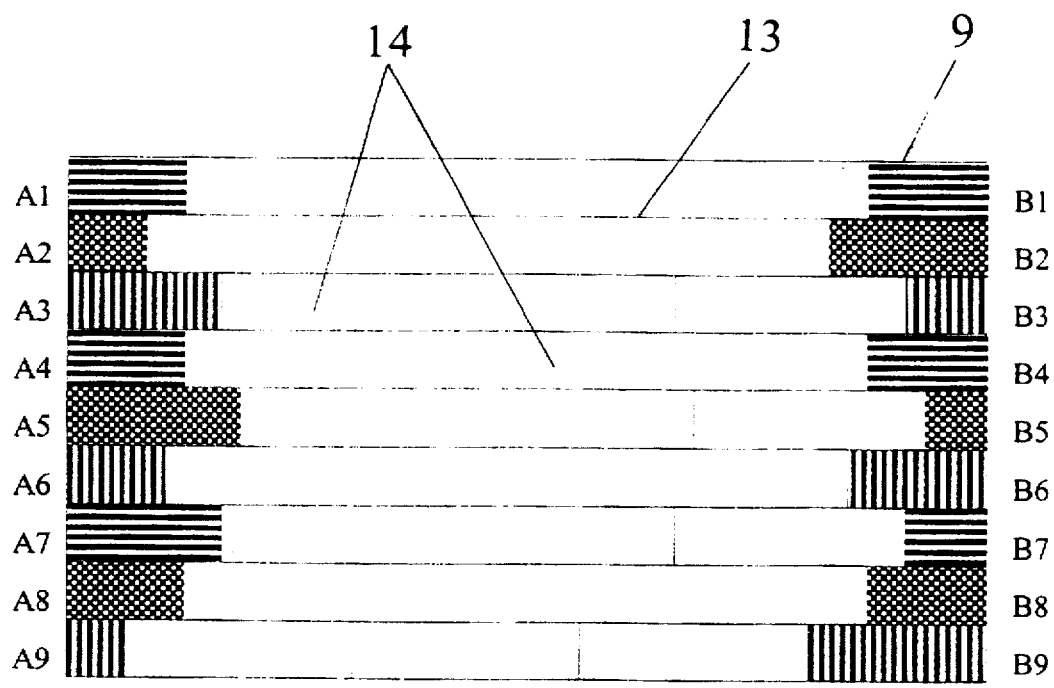
FIG. 4 is a sheet 13 of a patterned decor paper 9 according to an embodiment of the present invention. The sheet 13 consists of nine rows of bars 14 having, with exception for end bars A, B equal height and length. The left end bars of the pattern sheet are designated A1, A2, A3, A4, A5, A6, A7, A8 and A9, while the right end bars are designated B1, B1, B3, B4, B5, B6, B7, B8 and B9. The patterns of the left and right end bars A, B having the same ordinal numbers match each other in all rows. Bars 14 between the end bars A, B in each row are of elucidation purposes not provided with a pattern. In reality they are however provided with a wholly arbitrary pattern. The patterns of the different left and right end bars A, B match each other as follows.
Figure 5:
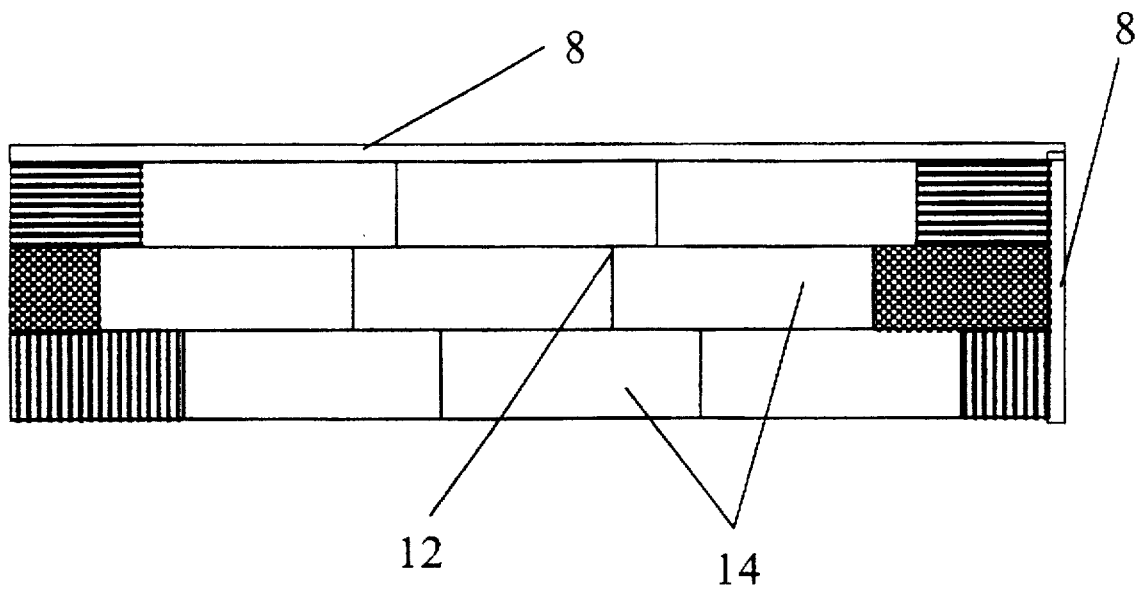

FIG. 5 is the floorboard 12 disclosed above (see under heading FIG. 4), the floor board 12 is in size and pattern equal to one of the panels into which the laminate (11) etc. can be divided.

Figure 6:
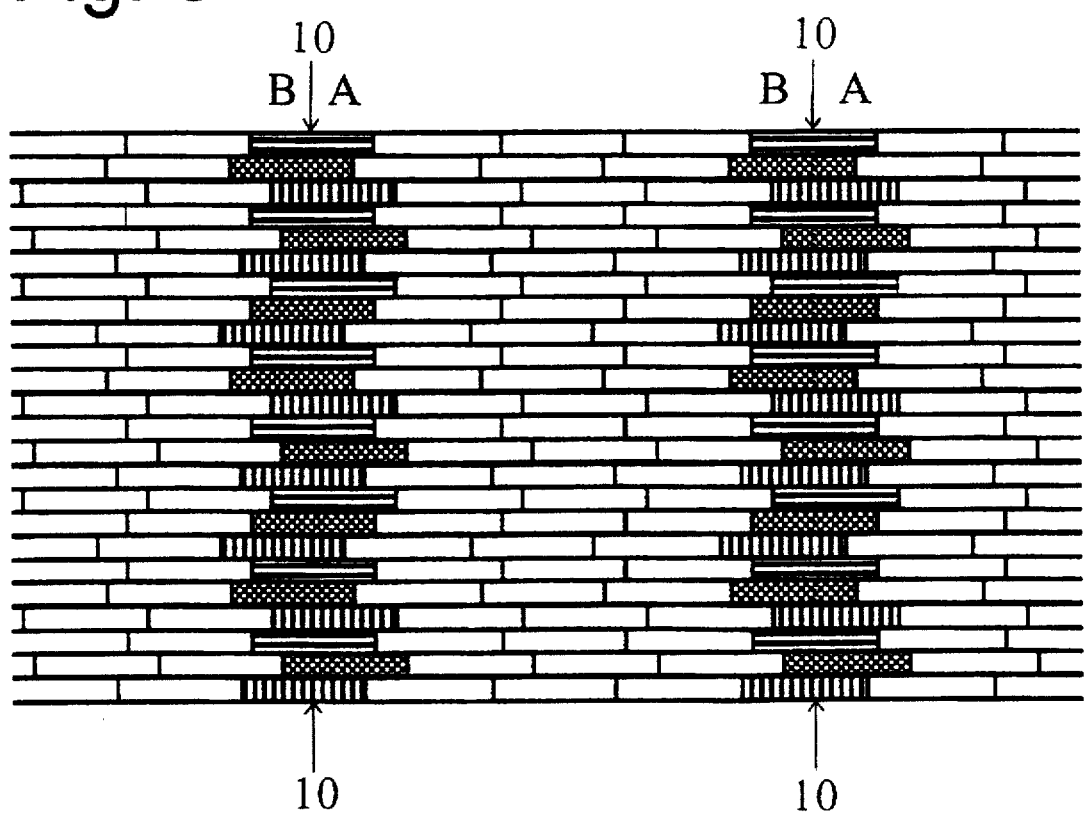

FIG. 6 shows how several floor boards 12 (see FIG. 5) have been put together to a floor. Arrowheaded lines 10 indicate where left end A and right end B bars meet. It is evident how the patterns of the left end A and corresponding right end B bars match each other.

According to the present invention a great advantage for the floor-layer is obtained, the short end matching has pre-determined a great number of uniquely fitting combinations, up to $p^2$ different combinations. Hereby, the floor-layer does not have to study the patterns of the different boards appreciably in advance, but can freely put board after board or actively use the fact that the end bars are pattern matched.

I claim:

1. A decorative thermosetting laminate (11), comprising two or more layers (3, 4, 5), the laminate (11) being produced by laminating the different layers (3, 4, 5) at a high pressure and at an increased temperature, wherein at least one layer is a decorative layer (4) consisting of at least one patterned decor paper (9) impregnated with at least one thermosetting resin, the decor paper (9) having a bar design composed of a plurality of parallel rows of bars (14), each bar (14) having a defined pattern, the bars (14) in adjoining rows being mutually offset in a longitudinal direction, the bar design allowing said laminate (11) to be divided into m longitudinal units or panels each consisting of p rows of bars, whereby said unit or panel comprises m×p rows of bars, the pattern of each left end bar (A1–A9) matching the pattern of corresponding right end bar (B1–B9) of each unit or panel and the pattern of these bars matching the pattern of corresponding end bars (A, B) in corresponding rows of all m units or panels.

2. The laminate (11) according to claim 1, wherein the thermosetting resin is a melamine-formaldehyde or urea-formaldehyde resin.

3. The laminate (11) according to claim 1, wherein m is 3 and p is 3, whereby the pattern of the left end bars (A1–A9) and right end bars (B1–B9) are repeated in every fourth row of bars (14) and wherein all bars (14) are of equal height and, with an optional exception for left end bars (A1–A9) and right end bars (B1–B9), of equal length.

4. A floor board (12) comprising i) a decorative thermosetting laminate (11), which laminate (11) comprises two or more layers (3, 4, 5) and is produced by laminating the different layers at a high pressure and at an increased temperature, wherein at least one layer is a decorative layer (4) consisting of at least one decor paper (9) impregnated with at least one thermosetting resin, the decor paper (9) having a bar design composed of a plurality of parallel rows of bars (14), each bar (14) having a defined pattern, the bars (14) in adjoining rows being mutually offset in a longitudinal direction, the bar pattern allowing said laminate (11) to be divided into m longitudinal panels or units each consisting of p rows of bars (14), whereby the pattern of each left end bar (A1–A9) matches the pattern of corresponding right end bar (B1–B9) and the pattern of these bars matching the pattern of corresponding end bars (A, B) in corresponding rows of all m panels or units; and ii) a carrier (6) to which said laminate (11) is bonded.

5. The floor board (12) according to claim 4, wherein the thermosetting resin is a melamine-formaldehyde or urea-formaldehyde resin.

6. The floor board (12) according to claim 4, wherein m is 3 and p is 3, whereby the pattern of the left end bars (A1–A9) and right end bars (B1–B9) are repeated in every fourth row of bars (14) and wherein all bars (14) are of eqaul height and, with an optional exception for left end bars (A1–A9) and right end bars (B1–B9), of equal length.

7. The floor board (12) according to claim 1, wherein the carrier (6) consists of wood or particle or fiber board.

8. The floor board (12) according to claim 1, wherein the laminate (11) is bonded to the carrier (6) by means of gluing or lamination.

9. A decor paper (9) for use in a decorative layer (4) of a thermosetting laminate (11), the decor paper (9) having a bar design composed of a plurality of parallel rows of bars (14), each bar (14) having a defined pattern, the bars (14) in adjoining rows being mutually offset in a longitudinal direction, the bar pattern allowing the decor paper (9) to be divided into m longitudinal units or sheets (13) each consisting of p rows of bars (14), whereby said unit or sheet (13) comprises m×p rows of bars (14), the pattern of each left end bar (A1–A9) matching the pattern of corresponding right end bar (B1–B9) of each unit or sheet (13) and the pattern of these bars matching the pattern of corresponding end bars (A, B) in corresponding rows of all m units or sheets (13).

10. The decor paper (9) according to claim 9, wherein said sheet (13) is produced from a roll having a repeated bar pattern, the roll being cut into sheets (13) all having a similar positioning of respective pattern.

11. The decor paper (9) according to claim 9, wherein m is 3 and p is 3, whereby the pattern of the left end bars (A1–A9) and right end bars (B1–B9) are repeated in every fourth row of bars (14) and wherein all bars (14) are of equal height and, with an optional exception for left end bars (A1–A9) and right end bars (B1–B9), of equal length.

12. The decor paper (9) according to claim 9, the decor paper (9) being impregnated with a thermosetting resin and laminated to a carrier (6).

13. The decor paper (9) according to claim 12, wherein the thermosetting resin is a melamine-formaldehyde or urea-formaldehyde resin.

14. The decor paper (9) according to claim 12, wherein the carrier (6) consists of wood or particle or fiber board.

* * * * *